United States Patent
Schmidt

(10) Patent No.: US 10,428,689 B2
(45) Date of Patent: Oct. 1, 2019

(54) HEAT SHIELD FOR A GAS TURBINE ENGINE

(71) Applicant: Rolls-Royce Deutschland Ltd & Co KG, Blankenfelde-Mahlow (DE)

(72) Inventor: Marcel Schmidt, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 174 days.

(21) Appl. No.: 15/649,622

(22) Filed: Jul. 13, 2017

(65) Prior Publication Data
US 2018/0334926 A1    Nov. 22, 2018

(30) Foreign Application Priority Data
May 17, 2017    (IN) .............. 201741017284

(51) Int. Cl.
  *F01D 25/14*    (2006.01)
  *F01D 25/16*    (2006.01)
  (Continued)

(52) U.S. Cl.
  CPC ............ *F01D 25/145* (2013.01); *F01D 9/04* (2013.01); *F01D 25/162* (2013.01); *F01D 25/24* (2013.01);
  (Continued)

(58) Field of Classification Search
  CPC ...... F01D 25/14; F01D 25/145; F01D 25/162; F01D 25/24; F01D 25/246; F02C 7/24; F05D 2260/231; F05D 2250/75; F05D 2240/12; F05D 2240/15; F05D 2230/642; F05D 2220/32
  See application file for complete search history.

(56) References Cited

U.S. PATENT DOCUMENTS

| 4,688,378 A | 8/1987 | Harris |
| 5,201,846 A * | 4/1993 | Sweeney .................. F01D 9/04 |
| | | 415/170.1 |

(Continued)

FOREIGN PATENT DOCUMENTS

| WO | WO 2014/201247 A1 | 12/2014 |
| WO | WO 2015/054095 A1 | 4/2015 |

OTHER PUBLICATIONS

Extended European Search Report, dated May 2, 2018, pp. 1-7, issued in European Patent Application No. 17197290.4, European Patent Office, Munich, Germany.

*Primary Examiner* — Grant Moubry
(74) *Attorney, Agent, or Firm* — Brinks Gilson & Lione

(57) ABSTRACT

A subassembly of a gas turbine engine includes a heat shield and carrier subassembly for a turbine section are disclosed. The carrier includes support features to couple to an engine casing. The upstream end of the carrier includes a radially inward arm extending toward to an engine axis. The outer end of the radially floating heat shield is coupled to the radially inward arm via a pin-and-slot joint configured to allow movement of the heat shield relative to the radially inward arm of the carrier. In response to thermal expansion and contraction of the vane, the heat shield is configured to move radially outward and inward, respectively, relative to the radially inward arm to maintain contact with the outer platform of the vane.

20 Claims, 7 Drawing Sheets

(51) Int. Cl.
*F01D 25/24* (2006.01)
*F02C 7/24* (2006.01)
*F01D 9/04* (2006.01)

(52) U.S. Cl.
CPC .............. *F01D 25/246* (2013.01); *F02C 7/24* (2013.01); *F05D 2220/32* (2013.01); *F05D 2230/642* (2013.01); *F05D 2240/12* (2013.01); *F05D 2240/15* (2013.01); *F05D 2250/75* (2013.01); *F05D 2260/231* (2013.01)

(56) References Cited

U.S. PATENT DOCUMENTS

| | | | |
|---|---|---|---|
| 6,347,508 B1 | 2/2002 | Smallwood et al. | |
| 6,514,041 B1 | 2/2003 | Matheny et al. | |
| 7,131,814 B2 * | 11/2006 | Nagler | F01D 11/005 |
| | | | 415/116 |
| 8,752,395 B2 | 6/2014 | McCormick et al. | |
| 9,945,240 B2 * | 4/2018 | Grant | F01D 9/065 |
| 9,963,988 B2 * | 5/2018 | Swedowicz | F01D 11/00 |
| 10,087,843 B2 * | 10/2018 | Budnick | F01D 9/041 |
| 2003/0165381 A1 | 9/2003 | Fokine et al. | |
| 2009/0033036 A1 * | 2/2009 | Marx | F01D 11/00 |
| | | | 277/347 |
| 2010/0047062 A1 * | 2/2010 | Khanin | F01D 11/08 |
| | | | 415/175 |
| 2011/0206502 A1 | 8/2011 | Rulli et al. | |
| 2013/0223982 A1 | 8/2013 | Durocher | |
| 2014/0271147 A1 | 9/2014 | Uskert et al. | |
| 2015/0082807 A1 | 3/2015 | Rauch et al. | |
| 2015/0354410 A1 * | 12/2015 | Budnick | F01D 25/28 |
| | | | 415/177 |
| 2016/0186611 A1 | 6/2016 | Vetters et al. | |
| 2016/0333788 A1 * | 11/2016 | Bogard | F01D 5/08 |
| 2017/0022829 A1 | 1/2017 | Freeman et al. | |
| 2017/0044919 A1 | 2/2017 | Pietrobon et al. | |
| 2017/0336074 A1 * | 11/2017 | Sander | F23R 3/002 |
| 2018/0094545 A1 * | 4/2018 | Dale | F01D 25/30 |

* cited by examiner

HEAT SHIELD FOR A GAS TURBINE ENGINE

CROSS REFERENCE TO RELATED APPLICATIONS

The present application is entitled to a right of priority pursuant to 35 U.SC. § 119 from India Patent Application No. 201741017284 filed May 17, 2017, which is herein entirely incorporated by reference.

TECHNICAL FIELD

The present disclosure relates generally to gas turbine engines and more specifically to heat shields for carriers of blade tracks or segments in the turbine section of gas of gas turbine engines.

BACKGROUND

At least some known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion may include a series of bladed disks to form a multi-stage, axial compressor. Fuel is added to the compressed air, and the mixture is combusted in the combustion portion. The resulting hot, high-pressure gas is then expanded through the turbine portion to extract energy therefrom. The turbine portion may include a series of vanes and bladed disk assemblies, complementarily forming a multi-stage turbine. As hot gases move through the turbine portion, a portion of the hot gases may, if not adequately protected, excessively heat the cavity and casing supporting the vanes, which may reduce the integrity and lifecycle span of the casing. Thus, a need exists for improved thermal management within the turbine portion, and methods for manufacturing the same.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of heat shields and heat shield/carrier configurations that may be used in the turbine section of gas turbine engines for any industry, such as, for example, to power aircraft, watercraft, power generators, and the like. The heat shield may be coupled to the carrier of the blade track or segment and is configured to float radially to maintain contact as the vane thermally expands and contracts during any engine running condition to form a radial seal to inhibit leakage or passage of the hot gases to the casing. Secondary air from the vane direction or hot gases from the turbine blade may push the heat shield in a longitudinal direction against the blade track carrier to form an axial seal to inhibit leakage or passage of the hot gases to the casing.

Figure 1:
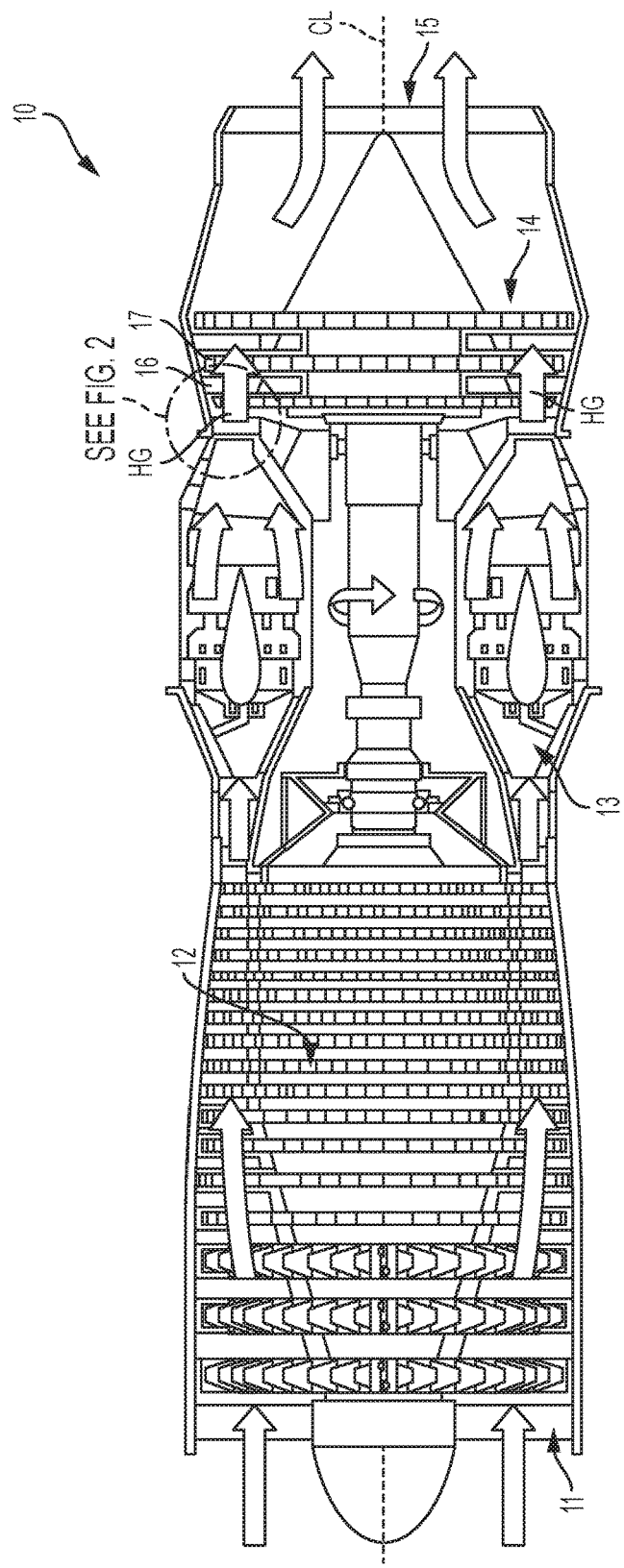
FIG. 1 depicts a cut-away view of an example gas turbine engine.

FIG. 1 is a cross-sectional view of one example of a turbine engine 10.

Although the example illustrated in FIG. 1 is a single path turbo jet engine, any form of gas turbine engine may be used, such as a turbojet, turbo prop gas turbine engine, a turbo shaft gas turbine engine, a turbofan gas turbine engine with a fan and high cold bypass, or a high bypass gas turbine engine. The engine 10 may include one or more of the following subassemblies: an air intake portion 11, a compressor portion 12, a combustion portion 13, a turbine section 14, and an exhaust portion 15 disposed along a longitudinal engine axis CL. The engine 10 may be used in any suitable application, such as, for example, to produce thrust in aircraft applications, to drive a propeller in aquatic applications, or to drive a generator in energy applications. In use, air received from the intake portion 11 may be compressed within the compressor portion 12. The compressor portion 12 includes a series of bladed disks to form a multi-stage, axial compressor. The compressed air may be then mixed with fuel and the mixture may be burned in combustion portion 13. The combustion portion 13 may include any suitable fuel injection and combustion mechanisms. The hot, high-pressure gas may be then passed through the turbine section 14 to extract energy from the gas, which in turn drives the compressor portion 12 while discharging thrust out the exhaust portion 15.

As shown, the turbine section 14 may include a series of alternating vanes 16 and turbine bladed disk assemblies 17 to form a multi-stage turbine. In use, the gas temperatures within the turbine section 14 may reach temperatures at or above 2000° F., 2400° F., or higher. Moreover, certain components within the turbine section 14, such as the flow path portion of the turbine bladed disk assemblies 17 may reach temperatures of between 1600 and 1900° F., and higher, due to the heat transferred from the hot gas (HG). To inhibit these temperatures from heating undesirable portions of the turbine section 14, in some embodiments, a heat shield may be disposed between the vane 16 and the turbine bladed disk assembly 17, as will be described. In the example of FIG. 1, the alternating vanes 16 and the turbine bladed disk assemblies 17 are identified in the high pressure section (HPT) section of the turbine. In other examples, the alternating vanes 16 and the turbine bladed disk assemblies 17 may be identified in any of the high pressure section (HPT), an intermediate section (IPT), or a low pressure section (LPT) of a gas turbine engine.

Figure 2:
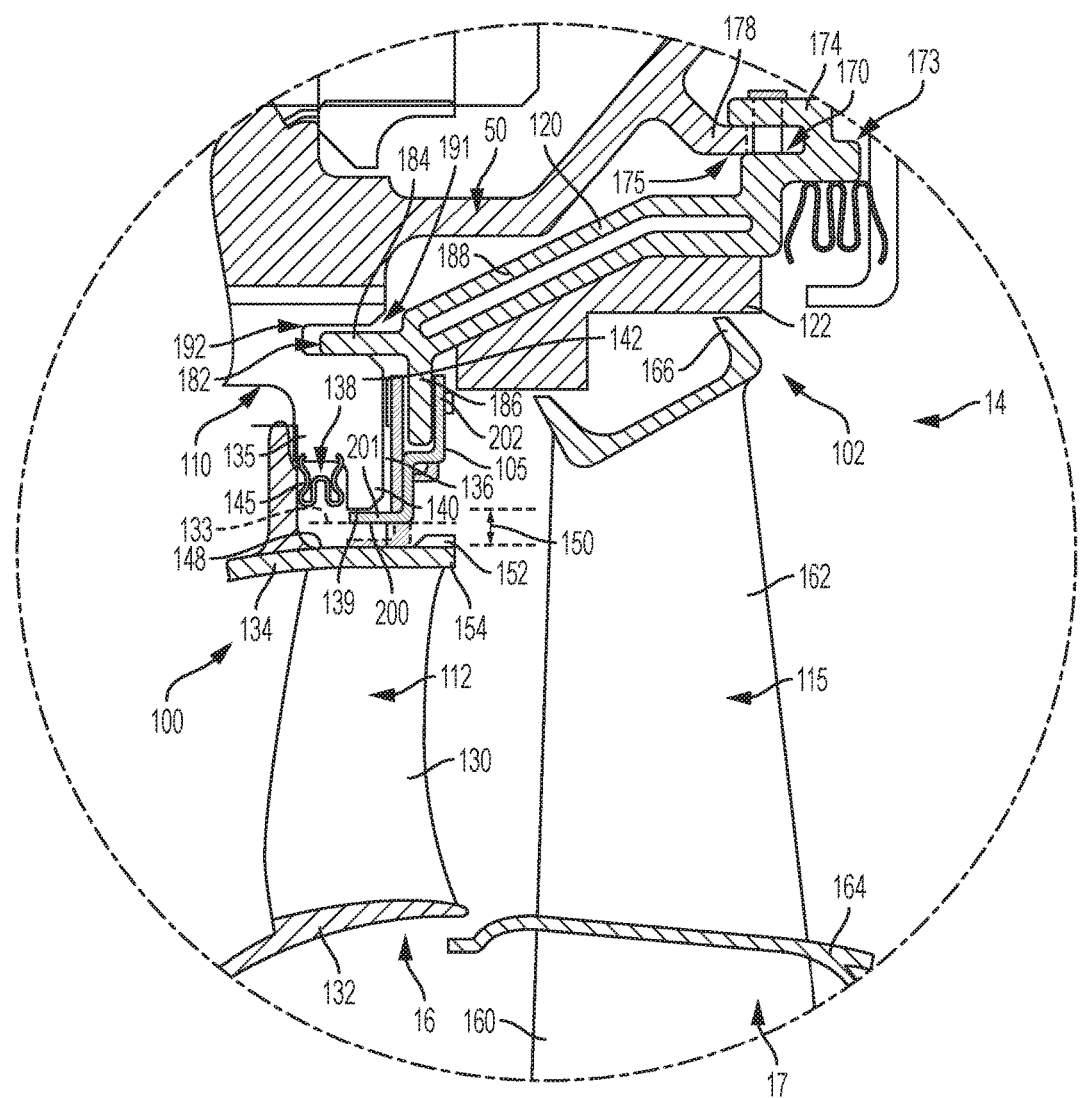
FIG. 2 is a cross-sectional detail view of an example turbine section of the gas turbine engine of FIG. 1, depicting an example of a heat shield disposed between a turbine shroud assembly and a vane assembly.

FIG. 2 illustrates an example of an engine casing 50 of the turbine section 14 housing a vane assembly 100 and a turbine shroud assembly 102 downstream from the vane assembly 100. A heat shield 105 is disposed between the vane assembly 100 and the turbine shroud assembly 102. The detailed view in the example of FIG. 2 is extracted from the high pressure section (HPT). In other examples the heat shield 105 may be disposed between a turbine shroud assembly and a vane assembly in an intermediate section (IPT), such as in a three shaft gas turbine, or a low pressure section (LPT) of a gas turbine engine. The vane assembly 100 may include a vane hanger support 110 securely fixed to the engine casing 50. The vane hanger support 110 when employed is circumferentially disposed about a turbine vane 112. The turbine shroud assembly 102 is circumferentially disposed about turbine blades 115 of the turbine bladed disk assembly. The turbine shroud assembly 102 includes a carrier 120 supporting a blade track 122 or blade segment 122. The carrier 120 is securely fixed to the engine casing 50.

The turbine vane 112 may be any turbine vane disposed within the turbine section 14. In one example, the turbine vane is a nozzle guide vane (NGV). The turbine vane 112 may be segmented or a complete annular ring. Each turbine vane 112 includes at least one vane airfoil 130 extending radially between inner and outer vane platforms 132, 134. The inner and outer vane platforms 132, 134 when assembled may be extended circumferentially about the engine axis CL to form respective rings that define radial flow boundaries for the flowing fluid. The turbine vane 112 is supported from the engine casing 50 alone or via the vane hanger support 110. The turbine vane 112 may include one or more support features (not shown), such as for example, axial hooks or rails or slots, that engage with the appropriate complementary feature of the engine casing 50 or the vane hanger support 110 when employed. The vane hanger support 110 may be secured to the engine casing 50, such as by the aforementioned support features, and/or integrally formed within the engine casing 50. When properly supported by the engine casing 50, the turbine vane 112 is oriented such that the vane airfoil 130 extends radially inward from the outer vane platform 134 to the inner vane platform 132. A plurality of vane airfoils 130 may be circumferentially spaced about the engine axis CL such that the vane airfoils and their outer and inner platforms cooperate to direct fluid flowing through the turbine section toward the downstream turbine blades and other downstream sections of the gas turbine engine. Each turbine vane segment or ring may be cast or otherwise suitably manufactured with one or more circumferentially spaced-apart vane airfoils. The turbine vane 112 is capable of thermal expansion and contraction between a thermal contracted configuration (shown in FIG. 2) when the gas turbine engine is cold or at engine startup and a thermal expanded configuration (radial distance position indicated by dashed line 133) when the gas turbine engine is hot after the engine is running.

In one example, the engine casing 50 includes a vane support element 135 that extends radially inward toward the engine axis CL. The vane support element 135 may be segmented to form a ring or form as a complete ring structure. The vane support element 135 includes a downstream facing annular surface 136. A radial notch 138 may be formed in the inner radial surface 139 of the vane support element 135 to define a radial lip 140 along the downstream end 142 of the vane support element 135. The turbine vane 112 and the engine casing 50 or the vane hanger support 110 may be sealably coupled to one another. In one example, the sealing between the turbine vane 112 and the vane support element 135 of the engine casing 50 may be achieved at least in part by means, such as by flexible annular metallic packing 145 having an omega, V or ω-shaped spring.

The outer vane platform 134 of the turbine vane 112 may extend parallel to the engine axis CL and downstream beyond the downstream facing annular surface 136 of the vane support element 135. The downstream facing annular surface 136 may extend radially perpendicular to the engine axis CL. The outer radial surface 148 of the outer vane platform 134 is spaced from the inner radial surface 139 of the vane support element 135 by a gap 150 when the turbine vane 112 is in the thermal contracted configuration. The spacing of the gap 150 has a first dimension when the engine is cold or at startup. The spacing of the gap 150 is reduced to minimal (with outer radial surface 148 of the outer vane platform 134 engageable with a portion of the heat shield 105 as will be described such that a radial seal is formed. The radial seal is configured to inhibit the flow of hot gases within the voids defined between the turbine vane 112 and the vane support element 135 of the engine casing 50. In one example, the outer vane platform 134 may include a radially outward ridge 152, for example, at the downstream end 154 of the outer vane platform 134. The ridge 152 is configured to inhibit the flow of hot gasses to the voids. In addition, the ridge 152 may provide axial stability of the heat shield 105. For example, where the heat shield 105 is loosely coupled, such as to the carrier 120, the ridge 152 may stop or deter movement, such as rotation, of the heat shield 105.

The turbine blade 115 of the turbine bladed disk assemblies may be any turbine blade disposed within the turbine section 14. In one example, the turbine blade is provided for a first stage of the turbine section. The turbine blade 115 may extend radially from a rotor disk 160. Each turbine blade 115 includes at least one blade airfoil 162 extending radially from a turbine platform 164 to a blade tip 166. The turbine platform 164 may be extended circumferentially about the engine axis CL to form a ring that defines radial flow boundaries for the flowing fluid. The turbine blades 115 may be circumferentially spaced about the engine axis CL such that the blade airfoils 162 and the turbine platform 164 cooperate to direct fluid flowing through the turbine section toward the downstream vanes and turbine blades and other downstream sections of the gas turbine engine. The turbine bladed disk assembly may be casted as a single unit or otherwise suitably manufactured with one or more circumferentially spaced-apart turbine blades. The number of turbine blades 115 may depend on the application of the turbine bladed disk assembly, for example, whether used in a high pressure, intermediate pressure, or low pressure stage, and what type of engine the turbine bladed disk assembly belongs to.

The turbine blade 115 is capable of thermal expansion and contraction between a thermal contracted configuration (shown in FIG. 2) when the gas turbine engine is cold or at engine startup and a thermal expanded configuration (not shown) when the gas turbine engine is hot after the engine is running. A turbine stage may maintain a very small tip clearance between the blade tip 166 and the blade track 122 of the turbine shroud assembly 102 surrounding the blade tip 166.

The carrier 120 is configured to maintain the blade track 122 in a desired position relative to the rotating blade tip 166 to control clearances between the blade track 122 and the blade tips 166. The turbine shroud assembly 102 may thermally expand and contract at relatively faster rates than that of the relatively slower responding, higher mass corresponding turbine bladed disk assembly having the blade airfoil 162 and disk 160. Accordingly, the tip clearance of the blade tips 166 may vary in size during transient engine operating conditions such as acceleration bursts and deceleration chops. The tip clearance is controlled and made as small as possible for good efficiency, however, the tip clearance may be sized larger than desirable for good efficiency because the blades 115 and turbine shroud expand and contract at different rates during the various operating modes of the engine. The amount of hot, high-pressure gas that passes over the blade tips 166 of the turbine blades 115 without pushing the turbine blades 115 to rotate may be managed as the turbine shroud assembly 102 thermally expands and contracts during operation of the gas turbine engine.

The carrier 120 is coupled to the engine casing 50 and configured to support the blade track 122 in a position adjacent the corresponding turbine blade 115. The carrier 120 is configured to change in size in response to a change in temperature during operation of the gas turbine engine. As the carrier 120 changes size circumferentially relative to the blade track 122, the inner diameter of the blade track 122 relative to the engine axis CL is adjusted to control the amount of tip clearance between the blade tips 166 and the blade track 122.

The carrier 120 may be made of a plurality of carrier segments circumferentially arranged adjacent to one another around the engine axis CL to form a ring. In one example, the carrier 120 may be a one-piece, monolithic component rather than a number of segments. The carrier comprises an axial slot 170 extending parallel to the engine axis. The axial slot 170 is formed in a radial outward portion 174 of a downstream end 173 of the carrier 120 to define a mounting flange 175. The axial slot 170 is sized and shaped to receive a downstream extending axial hook or rail 178 extending from the engine casing 50 or outer member of the casing.

Figure 2A:
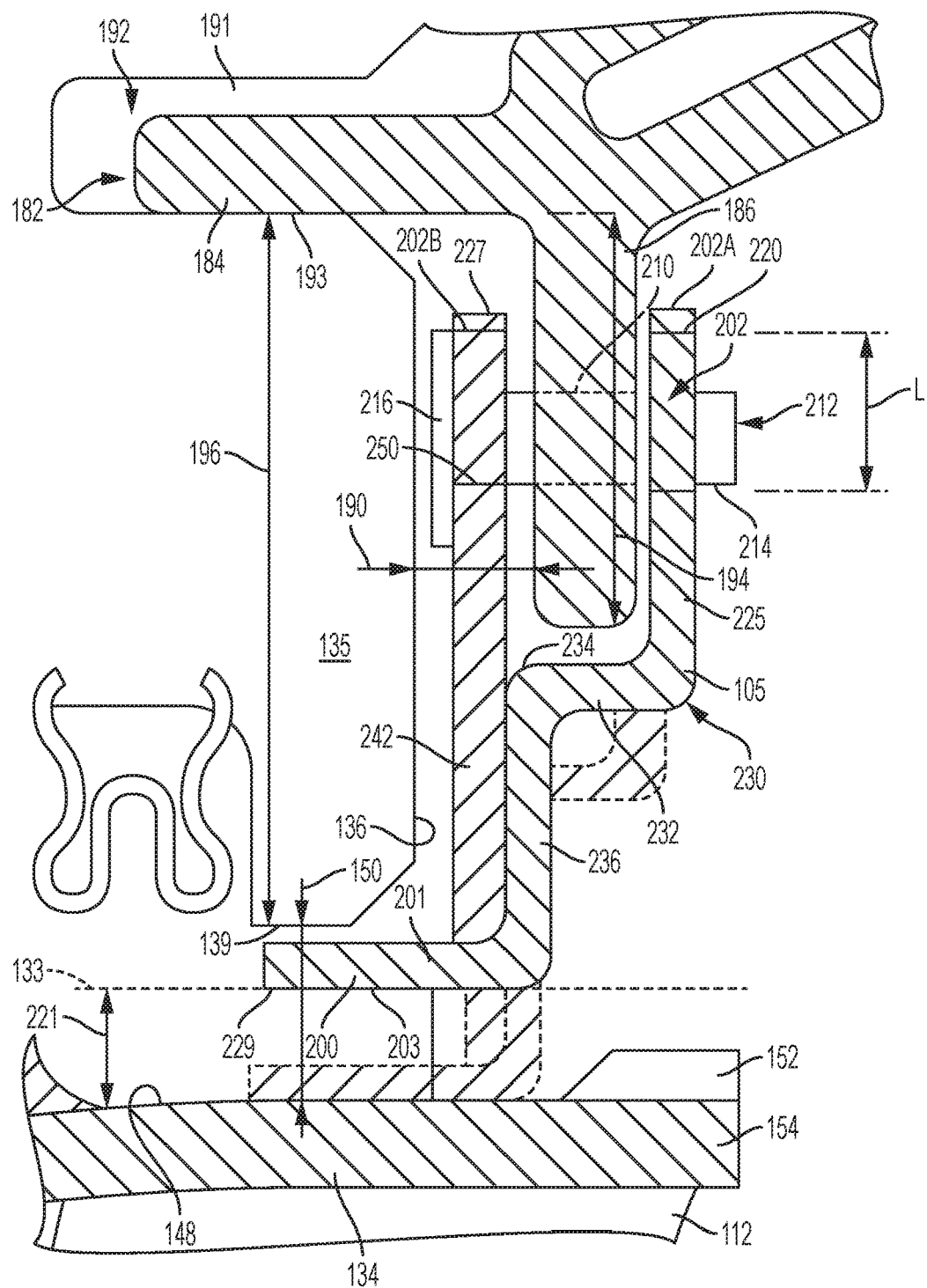
FIG. 2A is a detailed magnified view of an example of the heat shield in FIG. 2 coupled to an example carrier.

The carrier 120 includes one or more support features to couple to the engine casing. In one example, an upstream end 182 of the carrier 120 includes an upstream extending axial hook 184 or rail and/or a radially inward arm 186. The carrier body 188 is defined between the upstream end 182 and the downstream end 173. The carrier body 188 is shown tapered outwardly as the downstream end 173 has a radial position further outward than the radial position of the upstream end 182. The arm 186 may extend perpendicular to the engine axis CL. The arm 186 is shown extending radially toward the outer radial surface 148 of the outer vane platform 134 of the turbine vane 112. The arm 186 is shown extending in a manner that is spaced from and parallel to the downstream facing annular surface 136 of the vane support element 135 by a gap 190, as shown in FIG. 2A. The axial hook 184 is shown extending parallel to the engine axis CL and axially beyond the relative downstream position of the arm 186. The axial hook 184 is sized and shaped for insertion within an axial slot 191 of a mounting flange 192 formed in the engine casing 50 or element from the casing. In one example, the radial arm 186 extends a radial distance 194 selected from a range of 40-60% of the radial distance 196 between the inner radial surface 139 and the inner edge 193 of the axial slot 191 of the mounting flange 192, as shown in FIG. 2A.

The blade track 122 extends around a corresponding turbine blade 115 of the turbine bladed disk assembly to block combustion products from passing over the blade tip(s) 166 of the turbine blade 115 without extracting work by pushing the turbine blade 115 to rotate. The blade track 122 is concentric with the carrier 120. The blade track 122 may be made of a plurality of blade track segments. During operation of the engine, the blade track 122 is configured to move relative to the carrier as indicated above to adjust the inner diameter of the blade track 122.

As shown in the example of FIG. 2 and FIG. 2A, the heat shield 105 is coupled to the carrier 120. The heat shield 105 may be formed of metal, ceramic matrix composite, a metal composite, or any other heat resistant material. The heat shield 105 may be manufactured by, for example, molding, metal injection molding (MIM), and the like. The heat shield 105 is positioned and configured to inhibit the flow of hot gases within the voids or cavities defined between the outer vane platform 134 of the turbine vane 112 and the vane support element 135 and/or the engine casing 50. The heat shield 105 includes a floating configuration. In an example configuration, the heat shield 105 includes a series of overlapping segments of the heat shield 105 that are radially aligned to form a continuous barrier. Thus, the segments of the heat shield 105 may be overlapping in a radial direction so that the segments are circumferentially overlapping. In another example (not illustrated in FIG. 2 and FIG. 2A), the heat shield 105 may be a floating configuration in the form of a single unitary monolithic structure radially aligned with outer vane platform 134 and concentric with the engine axis CL.

In a floating heat shield, an inner end engagement portion 200 of the heat shield 105 maintains engagement with the outer radial surface 148 of the outer vane platform 134 of the turbine vane 112 when the engine is cool or hot. To this end, as the turbine vane 112 thermally expands, the outer vane platform 134 expands radially outward urging the heat shield 105 to move radially outward. In an example configuration where the heat shield 105 is formed as overlapping segments, the segments may be less and less overlapping as the heat shield 105 moves radially outward such that the amount of radial and circumferential overlap of the segments is reduced. As the turbine vane 112 thermally contracts, the outer vane platform 134 contracts radially inward and heat shield 105 may fall or settle radially inward to maintain engagement with the outer vane platform 134. In an example configuration where the heat shield 105 includes overlapping segments, the segments of the heat shield 105 may increasingly overlap as the heat shield 105 falls or settles radially inward such that the amount of circumferential and radial overlap of the segments of the heat shield 105 increases. In the case of a heat shield 105 being a singly monolithic structure, the heat shield 105 may include a break or a gap such that the structure is not a continuous circular structure such that the diameter of the heat shield 105 may increase and decrease as the turbine vane 112 radially expands and contracts.

The radial movement of the carrier 120 to change the inner diameter of the blade track 122 and thus control the amount of tip clearance between the blade tips 166 and the blade track 122 may be set to a minimum to minimize gaping between the blade tips 166 and the blade track 122 and thereby optimize performance. An inward settling bias of the heat shield 105 to maintain engagement with the outer radial surface 148 may be based on secondary air pressure. Inward settling may be constrained by surrounding structure, such as the limited movement of the carrier 120 in the axial slot 191, and a moveable joint coupling between the heat shield 105 and, for example, the carrier 120.

In an example, the heat shield 105 may be coupled to the radially inward arm 186 via a joint in the form of a pin-and-slot joint configured to allow movement of the heat shield 105 relative to the radially inward arm 186. Thus, in an example configuration where the heat shield 105 is formed by radially and circumferentially overlapping segments, each of the segments may be coupled to the radially inward arm 186 via a pin-and-slot joint configured to allow radial movement of the segments. In this example configuration, there may be two joints (in the form of pin-and-slot joints) per segment independent of one another within the constraints as previously discussed. In other example configurations additional or fewer pin-and-slot joints may be present in each segment.

In another example configuration, the heat shield 105 may be a floating heat shield coupled to, for example, the radially inward arm 186, via joint such as a foot-and-slot joint. The foot-and-slot joint may be configured to allow movement of the heat shield 105 relative to a structure to which the heat shield 105 is coupled, such as the radially inward arm 186, and the pin-and-slot joint may be omitted. In an example, the heat shield 105 is formed as a radial ring by radially and circumferentially overlapping segments. In the example of the foot-and-slot joint configuration for segments or a single unitary structure, each of the segments or the single unitary structure may be coupled to, for example, the radially inward arm 186 by being slid into a slot in the structure, such as the carrier 120, so as to allow radial movement of the segments or the single unitary structure by radial movement of the foot of respective segments in the slot. In this example configuration, each of the segments may individually and independently move within the slot within the constraints as previously discussed. In addition, in the case of the single unitary structure, the feet of the heat shield may move circumferentially in the slot as well as radially.

The engagement portion 200 of the heat shield 105 is disposed at a radially inward position of the heat shield 105 and an outer end coupling portion 202 of the heat shield 105 configured for coupling to the carrier 120 is disposed at a radially outward position of the heat shield 105. The engagement portion 200 is shown having an upstream extending axial rim 201. The axial rim 201 may be sized for an increased sealing surface between the rim and the platform. In one example, the axial rim 201 extends upstream parallel to the engine axis CL beyond the downstream facing annular surface 136 of the vane support element 135, and in some examples, the axial rim 201 is disposed between the inner radial surface 139 of the vane support element 135 and the outer radial surface 148 of the outer vane platform 134. The heat shield 105 is movable between a first configuration and a second configuration. In the first configuration, the outer end(s) 227 of the coupling portion 202 is at a first radial position and an inner surface 203 of the engagement portion 200 is contacting the outer radial surface 148 of the outer vane platform 134 of the turbine vane 112 when in the thermal contracted configuration. In the second configuration, the outer end 227 of the coupling portion 202 is moved radially outward to at a second radial position and the inner surface 203 of the engagement portion 200 is contacting the outer radial surface 148 of the outer vane platform 134 of the turbine vane 112 when is in the thermal expanded configuration. In both the thermally contracted configuration and the thermally expanded configuration the segments of the heat shield 105 may be overlapping to create a continuous barrier.

With reference to the example of FIG. 2A, the coupling portion 202 of the heat shield 105 is coupled to the arm 186 of the carrier 120. In examples, each of the segments may include the coupling portion 202, or the coupling portion 202 may be intermittently included in some of the segments, or the coupling portion 202 may be selectively include in some of the segments of the heat sink 105. In examples where each of the segments does not include the coupling portion 202, those segments where the coupling portion 202 is absent may be coupled to radially and circumferentially overlapping segments that do include the coupling portion 202.

In the illustrated examples of FIGS. 2 and 2A, the arm 186 includes one or more bores 210 extending therein. The axis of the bore 210 may be parallel with the engine axis CL. The bore 210 is sized to snugly receive a shaft 214 of a pin 212 such that the outer diameter of the pin shaft 214 is sized substantially the same as the inner diameter of the bore 210. The pin 212 may have a head 216 disposed at an end of the pin shaft 214 that is sized larger than the inner diameter of the bore 210. With additional reference to FIGS. 3-4, in an example, the coupling portion 202 of a segment 300 includes one or more slots 220 formed therein that are associated with corresponding bores 210. In an example, the slot 220 may be an elongated slot having a width sized substantially the same as the diameter of the pin shaft 214. The slot 220 may generally extend in the radial direction by a slot length L. The slot length L may correspond to the degree of radial distance movement 221 of the floating heat shield 105 to the dashed line 133 due between thermal expansion and contraction. The engagement between the pin shank and the outer radial end of the slot 220 may define the first radial position when the heat shield is in its first configuration, and the engagement between the pin shank and the inner radial end of the slot 220 may define the second radial position when the heat shield is in its second configuration. In other examples, the locations of the bore and the slot may be reversed such that the bore is formed in the heat shield, and the slot is formed in the carrier.

Figure 4:
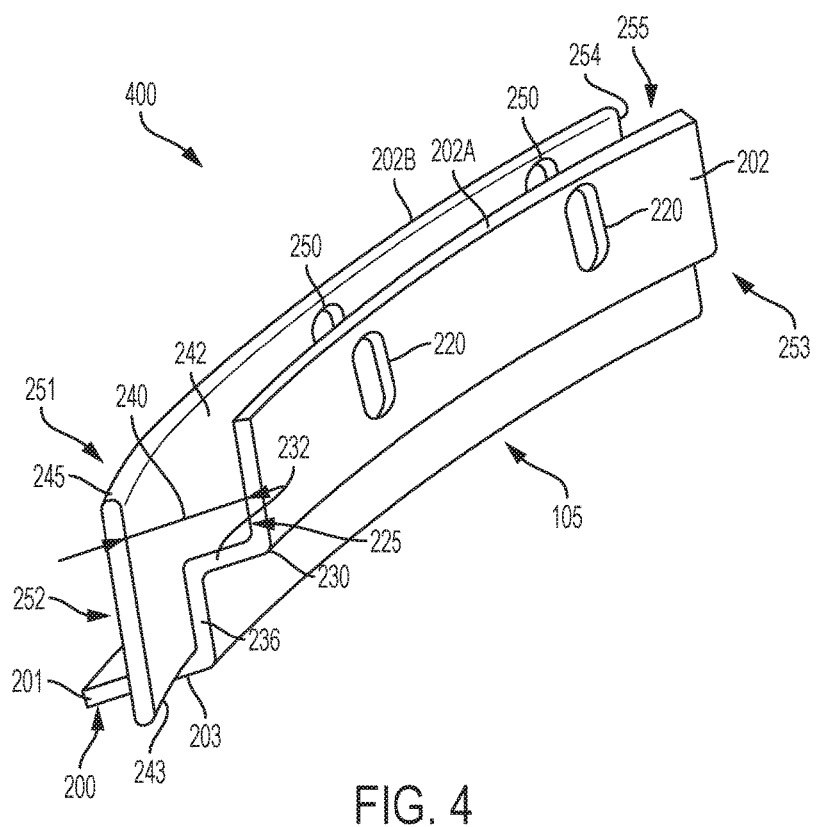
FIG. 4 is a perspective view of an example of a heat shield annular segment.

The heat shield includes a body 225 extending between the outer end 227 associated with the coupling portion 202 and an inner end 229 associated with the engagement portion 200. FIG. 4 depicts an example of a segment 400 that includes the coupling portion 202. The coupling portion 202 may extend radially and perpendicularly to the engine axis CL, with the heat shield body 225 extending from a bend 230 to an upstream extending axial rim 232 and extending from a second bend 234 from the axial rim 232 to a radial leg 236 extending radially and perpendicular to the engine axis. The radial leg 236 is coupled to the engagement portion 200. The axial length of the axial rim 232 may be sized to correspond to at least the thickness of the arm 186. The radial length of the coupling portion 202 may be sized to correspond to at least the radial length of the arm 186.

In an example, the coupling portion 202 may include two legs (referred to as legs 202A, 202B) to form a yoke configuration. The legs 202A, 202B may extend radially and perpendicular to the engine axis CL. The legs 202A, 202B are separated from one another by a leg gap 240 sized to allow the arm 186 to fit therebetween, as shown in FIG. 4. In one example, the second leg 202B may be formed from an outer portion of a separate discrete metal or ceramic sheet 242 that is sized to fit within the gap 190 between the arm 186 and the vane support element 135. In another example, the head 216 and the thickness of the second leg 202B is sized to be received within the gap 190.

The inward portion 243 of the sheet 242 may be securely fixed to the upstream face of the radial leg 236, such as welding, brazen, soldering, or other attachment mechanisms. The outer portion 245 of the sheet 242 is shown spaced from the coupling portion 202 by the leg gap 240. The combined thickness of the sheet 242 and the radial leg 236 may provide further heat shielding. The second leg 202B includes one or more second slots 250 formed therein that are associated with corresponding bores 210 of the arm 186 and in coaxial alignment with corresponding slots 220. The second slot 250 may be an elongated slot having a width sized substantially the same as the diameter of the pin shaft 214. The second slot 250 may generally extend in the radial direction by the same length as the slot length L that corresponds to the degree of movement of the floating heat shield due to thermal expansion and contraction. The pin shaft 214 is shown extending downstream through the second slot 250, the bore 210, and the slot 220 and beyond the slot 220. The material of the sheet 242 may be same or have similar thermal expansion/contraction properties as the material of the heat shield body. The material of the sheet 242 may include different insulated or conduction properties than the heat shield body.

Figure 3:
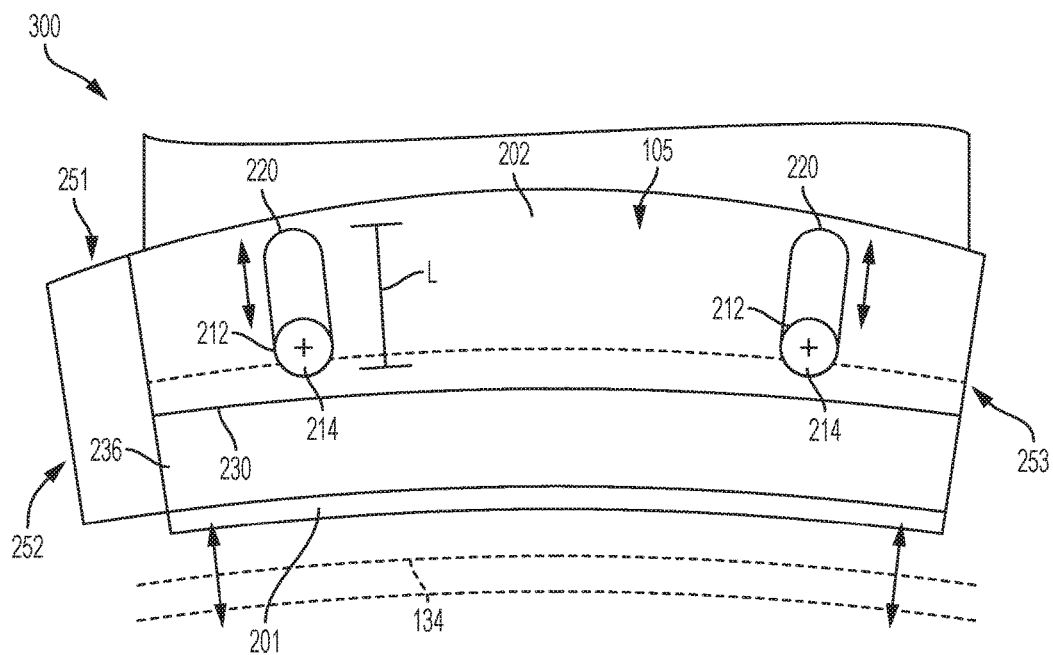
FIG. 3 is an upstream view of an example heat shield coupled to an example carrier.

Referring to FIGS. 3 and 4, the leg 202B may also include an overlap portion 251 of the sheet 242 extending beyond the axial rim 201 to form a first end 252 of the segment 300 or 400. The overlap portion 251 may radially and circumferentially overlap with a neighboring segment of similar design (not shown) to provide a continuous seal or barrier. The axial rim 201 and the leg 202A may form a second end 253 of the segment 300 or 400. The sheet 242 of the leg 202B may not extend to the second end 253, whereas the leg 202B may extend to the second end 253, such that an overlap portion 251 from a neighboring overlapping segment (not shown) is positioned in a receiving area 254 to be radially outward of the axial rim 201, parallel with the leg 202A, and circumferentially adjacent a recessed end 255 of the sheet 242. In other words, the sheet 242 does not extend to the second end 253 so as to create a receiving area 254 in which an overlap portion 251 of a neighboring segment may be positioned to radially and circumferentially overlap with the segment 300 or 400 as part of the continuous seal or barrier. Thus, in the receiving area 254, the gap 240 may be formed between the overlap portion 251 of the leg 202B of a neighboring segment (not shown) and the leg 202A of the segment 300 or 400.

The recessed end 255 of the sheet 242 and the overlap portion 251 of the neighboring segment may be sufficiently spaced away from each other to allow circumferential movement of the circumferentially neighboring segments as thermal expansion and contraction occurs, During such circumferential movement, the overlap portion 251 may move laterally along the axial rim 201 of a circumferentially neighboring segment while maintaining a position radially outward from the axial rim of circumferentially neighboring segment to maintain the continuous seal or barrier. In examples where the segments of the heat shield include only a single leg, the overlap portion 251 may be formed at a first end of the single leg and the recessed end 254 may be formed at an second opposite end of the single leg.

Figure 5:
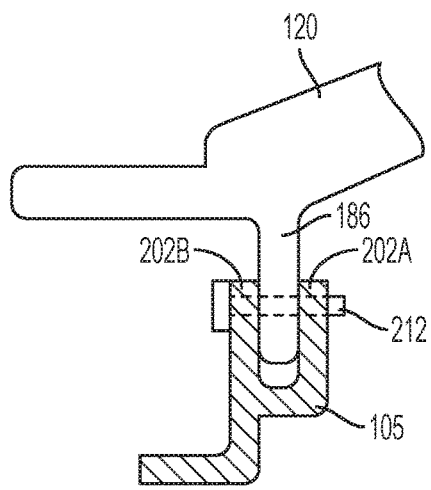
FIG. 5 is a cross-sectional view of an example of a heat shield coupled to an example carrier.
Figure 6:
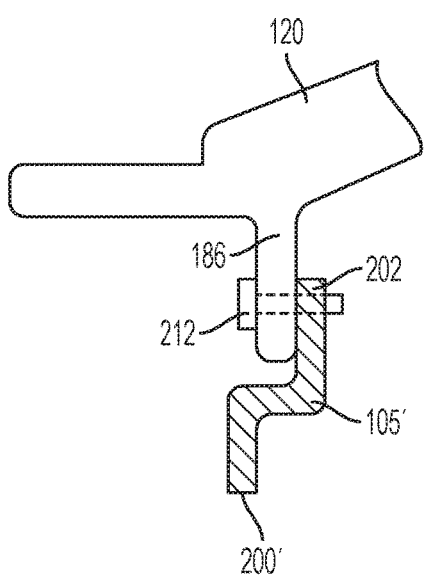
FIG. 6 is a cross-sectional view of another example of a heat shield coupled to an example carrier.

FIG. 5 depicts the heat shield 105 with the heat shield body 225 and the sheet 242 forming the legs 202A, 202B formed integrally from a single unit such as, for example, a casted unit. FIG. 6 depicts the heat shield (now referred to the heat shield 105') with a single leg coupling portion 202. The heat shield 105' also shows the engagement portion 200' without the axial rim 201. The engagement portion 200' may be applied to any one of the heat shields described herein.

Figure 7:
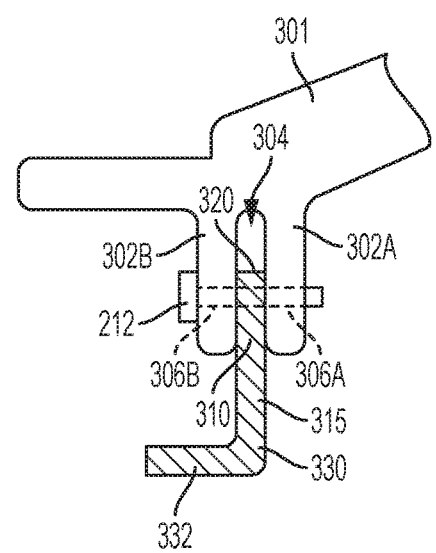
FIG. 7 is a cross-sectional view of another example of a heat shield coupled to an example of a carrier.

FIG. 7 illustrates an alternative example carrier 301 including a pair of radially inward first and second arms 302A, 302B spaced from one another by a gap 304. The bore 306A of the first arm 302A is in coaxial alignment with the bore 306B of the second arm 302B. The bores 306A, 306B are sized to receive the pin 212. The coupling portion 310 of the heat shield 315 is sized to fit within the gap 301. The coupling portion 310 includes the slot 320 shaped similar to the slot 220. The slot 320 is positioned to receive the pin 212. The engagement portion 330 includes the upstream extending axial rim 332.

Figure 8:
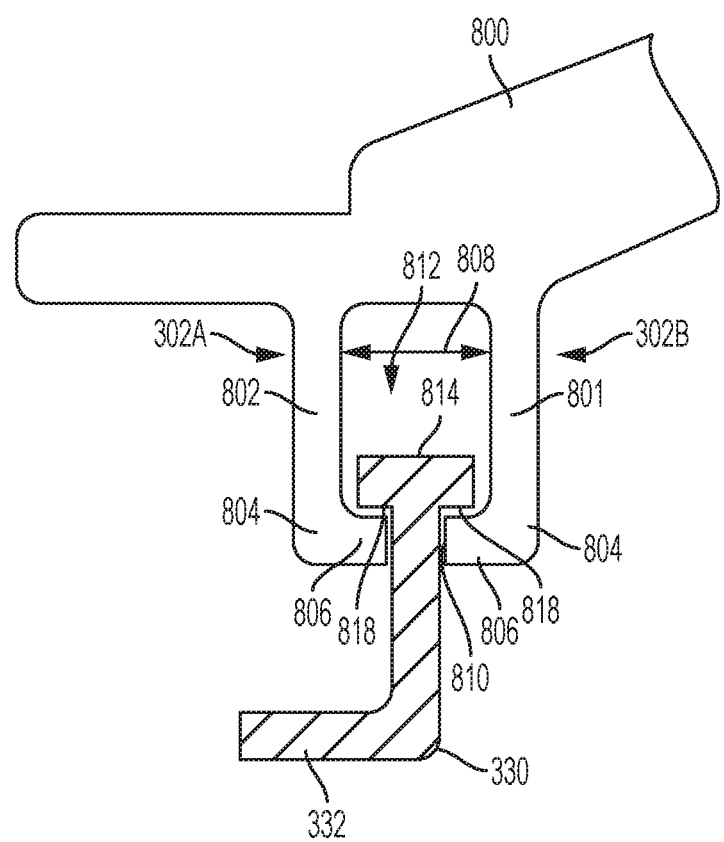
FIG. 8 is a cross-sectional view of another example of a heat shield coupled to an example of a carrier.

FIG. 8 illustrates another alternative example of a heat shield 815 and a carrier 800 including a pair of radially inward first and second arms 302A, 302B that include walls 802 extending radially inward, bends 804 which form shoulders 806 extending perpendicular to the walls 802. The walls 802 are spaced from one another by a first gap 808, and the shoulders 806 are spaced from one another by a second gap 810. The walls 802, bends 804 and shoulders 806 form a slot 812 or enclosed slot. The slot 812 may be sized to receive a foot 814 included in the coupling portion 816 of the heat shield 815. The foot 812 may be sized smaller than the first gap 808 so as to be capable of moving radially within the slot 812, but larger than the second gap 810 so as to be maintained in the slot 812 or cavity to form a foot-and-slot joint. The foot 812 may be formed as widened portion at a distal end of the heat shield 815 or as a separate component coupled at the distal end. In the illustrated example, the foot 812 is a rectangular shaped feature with ledges 818. Ledges 818 are formed to contact the shoulders 806 when the heat shield 815 is at a radially inward position in the cavity 812 such that the engagement portion 330 extends away from carrier 120 a maximum distance. In other examples, the ledges 818 and the foot 812 may be any shape or configuration providing a moveable joint mechanism that restricts but still allows radial movement of the heat shield 815. The engagement portion 330 includes the upstream extending axial rim 332. In other example configurations, the heat shield 815 may be in a foot-and-slot configuration so as to be radially moveable in a slot formed by one or more of a carrier, a blade track, nozzle guide vanes, a casing and/or any other structure in the gas turbine engine.

Figure 9:
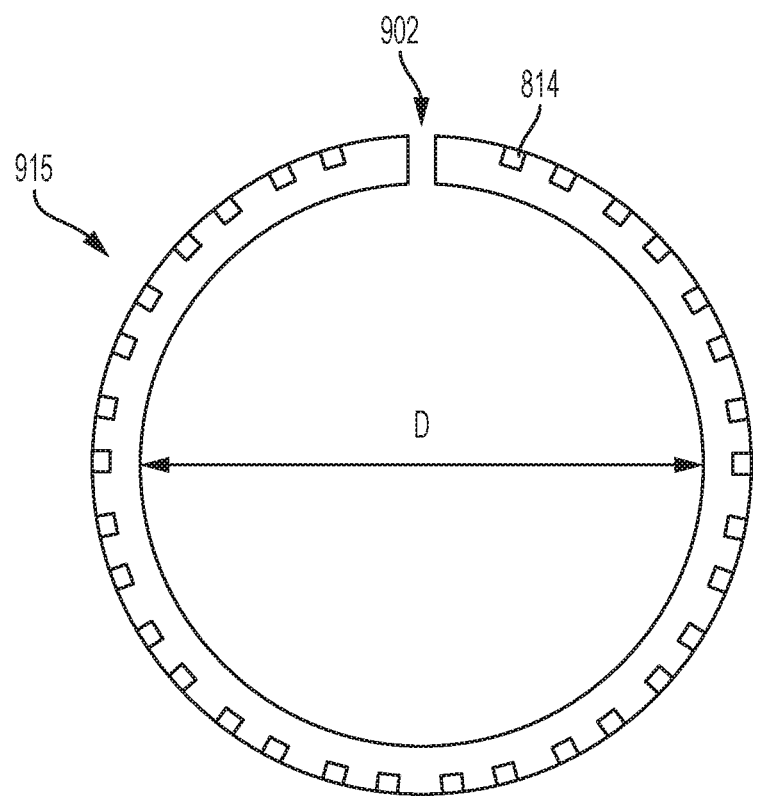
FIG. 9 is an example of a heat shield illustrated as a full three hundred sixty degree ring.

FIG. 9 is an example of a floating heat shield 915 that may be moveably coupled with a structure such as a carrier. With reference to FIGS. 2-9, similar to the previously discussed heat shield 105 and 315 and 815, the heat shield 915 may be formed as an annular structure, or a circular ring, concentric with and radially extending toward the engine axis CL, to form a barrier. The heat shield 915 of this example may be formed as a three hundred and sixty degree annular ring by a single unitary structure that includes a number of feet 814. In other examples, fewer or greater numbers of feet 814 may be included. In still other examples, the heat shield 915 may be formed as a three hundred and sixty degree annular ring by a number of different individual independent segments that include slots as previously discussed.

The coupling portion 202, 310 and 810 may include foot-and-slot joints (or pin-and-slot joints) to couple with a carrier or other structure in the gas turbine engine so as to be radially moveable. Alternatively, the feet 814 may be omitted and the heat shield may be trapped between a carrier, a blade track, nozzle guide vanes, a casing and/or any other structure in the gas turbine engine so as to be radially movable. Trapping of the heat shield 915 may involve a portion of the heat shield 915, such as the coupling portion 202 being placed in compression by structure within the turbine engine. As the heat shield 915 radially moves, a diameter D of the ring may expand and contract. In the case of the heat shield 915 being formed from individual segments, the segments may be radially and circumferentially overlapping to form a continuous barrier thereby allowing a diameter D of the ring to expand and contract as the heat shield 915 radially moves.

The heat shield 915 may be formed with flexible material to include a gap 902. The gap 902 may be formed by omitting a portion of the three hundred sixty degree ring. Using the gap 902, the heat shield 915 may be, for example, slid into a slot, such as slot 812 formed in the carrier, so as to create foot-and-slot joints. In a configuration as a single monolithic structure and using the foot-and-slot joints, part count may be significantly reduced. In addition, in the example of the heat shield 915 being a continuous unitary monolithic structure, the gap 902 may become smaller and larger as the heat shield 915 moves radially in response to heating and cooling by moving radially and also moving circumferentially around the engine axis CL. When the heat shield 915 is formed from individual segments, the gap 902 may be omitted since the segments may radially and circumferentially overlap to allow circumferential movement.

The heat shield 105 may be movably coupled to the carrier 120 of the blade track and is configured to float radially in order for the inner end 229 of the heat shield 105 to maintain contact with the outer vane platform 134 of the turbine vane 112. (FIG. 2) As the turbine vane 112 thermally expands and contracts during any engine running condition, a radial seal may be formed between the heat shield 105 and the turbine vane 112 to inhibit leakage or passage of the hot gases running through the turbine vane 112 and pushing the turbine blades to the casing. The pressure of the hot gases may also move the heat shield 105 in the upstream direction against the radially inward arm 186, or first and second arms 302A, 802A and 302B, 802B of the carrier 120 to form an axial seal, in addition to or instead of the radial seal. Either any secondary air from the compressor section or the hot gases may push the heat shield 105 against the carrier 120. The heat shield 105 is configured to maintain sealably contact with the turbine vane 112 in order to not leave the engine casing 50 and/or vane support element 135 unprotected or only partially protected, due to gas turbine engines running at hot temperatures. The heat shield configuration may be beneficial for gas turbine engines that are expected to run hotter for reduced fuel consumption strategies. The heat shield configuration may also be a cost-effective solution over more intricately designed casings and/or casing materials with costly higher temperature capability.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

The subject-matter of the disclosure may also relate, among others, to the following aspects:

1. A subassembly for a gas turbine engine having a longitudinal engine axis, the subassembly comprising: a carrier having one or more support features to couple to a casing of an engine, the carrier including a downstream end and an upstream end, the upstream end of the carrier including a radially inward arm extending toward the engine axis; and a radially floating heat shield including an outer end and an inner end, the outer end of the radially floating heat shield coupled to the radially inward arm via a joint configured to allow movement of the radially floating heat shield relative to the radially inward arm.

2. The subassembly of aspect 1, wherein the joint is a pin-and-slot joint, the radially inward arm includes a bore defined therein, and the heat shield includes a slot defined therein in alignment with the bore to receive a pin.

3. The subassembly of aspect 1, wherein the joint is a foot-and-slot joint, the radially inward arm includes a slot defined therein, and the heat shield includes a foot sized to fit within the slot.

4. The subassembly of any one of aspects 1-3, wherein the inner end of the heat shield includes an upstream extending axial rim.

5. The subassembly of any one of aspects 1-4, wherein the outer end of the heat shield includes a first leg and a second leg separated from one another by a gap.

6. The subassembly of any one of aspects 1-5, wherein the heat shield includes a coupling portion extending radially along the outer end, an upstream extending axial rim, a first bend coupling the coupling portion and the upstream extending axial rim, a radial leg, and a second bend coupling the upstream extending axial rim and the radial leg.

7. The subassembly of aspect 6, wherein the heat shield comprises a discrete sheet having a bottom portion securely fixed to the radial leg, and an outer portion spaced from the coupling portion.

8. The subassembly of aspect 6, wherein the coupling portion defines a first leg, and the heat shield further comprises a second leg spaced from the first leg by a gap formed to receive the radially inward arm.

9. The subassembly of any one of aspects 1-8, wherein the heat shield is an annular structure.

10. A subassembly for a gas turbine engine including a turbine section, the gas turbine engine comprising: a casing of a turbine section housing a vane and a turbine blade disposed downstream from the vane, wherein the vane includes an outer platform, the vane coupled to the casing by a vane support element; a turbine shroud assembly circumferentially disposed about the turbine blade, the turbine shroud assembly including a carrier supporting a blade track; and a heat shield coupled to the carrier and in movable contact with the outer platform, wherein, in response to thermal contraction of the vane, the heat shield is configured to move radially inward relative to the carrier to maintain contact with the outer platform of the vane.

11. The subassembly of aspect 10, wherein the carrier includes a radially inward arm axially spaced from the vane support element and radially spaced from the outer platform, and the heat shield is coupled with the radially inward arm, wherein the radially inward arm includes a bore or a slot defined therein, and the heat shield includes a bore or a slot defined therein in alignment with the bore or the slot of the radially inward arm, the bore and the slot configured and aligned to receive a pin.

12. The subassembly of any one of aspects 10, wherein the carrier includes a slot, and the heat shield includes a foot in a coupling portion of the heat shield, the foot slideably position in the slot to enable movement of the heat shield in a radial direction in accordance with temperature changes wherein the slot is defined within an outer portion of the heat shield.

13. The subassembly of any one of aspects 10-12, wherein an outer portion of the heat shield comprises a first leg and a second leg spaced from one another to define a gap sized to receive the radially inward arm of the carrier, wherein the first leg comprises the slot defined therein, and the second leg comprises a second slot defined therein in alignment with the slot of the first leg, wherein the pin is extended through the slot, the bore, and the second slot.

14. The subassembly of any one of aspects 10-13, wherein the vane support element includes a downstream facing surface axially spaced from the radially inward arm, and an inner radial surface radially spaced from the outer platform.

15. The subassembly of aspect 14, wherein an inner end of the heat shield includes an axial rim extending upstream beyond the downstream facing surface.

16. The subassembly of any one of aspects 10-15, wherein the outer platform includes a ridge extending radially outward toward the heat shield.

17. The subassembly of any one of aspects 10-16, wherein the carrier further includes a radially inward second arm spaced from the radially inward arm by a gap sized to receive an outer end of the heat shield.

18. A subassembly for a gas turbine engine including a turbine section, the gas turbine engine comprising: a casing of a turbine section housing a vane and a turbine blade disposed downstream from the vane, wherein the vane includes an outer platform, the vane coupled to the casing by a vane support element; a carrier to support a blade track, the carrier circumferentially disposed about the turbine blade and coupled to the casing; and an annular heat shield having an outer portion coupled to the carrier and an inner portion contacting the outer platform, the annular heat shield movable between a first configuration and a second configuration, wherein, in the first configuration, the outer portion is at a first radial position, the inner portion is contacting the outer platform, and the vane is in a thermal contracted configuration, wherein, in the second configuration, the outer portion is moved radially outward to a second radial position, the inner portion is contacting the outer platform, and the vane is in a thermal expanded configuration.

19. The subassembly of aspect 18, wherein the carrier including a radially inward arm axially spaced from the vane support element and radially spaced from the outer platform, the vane support element includes a downstream facing surface axially spaced from the radially inward arm, and an inner radial surface spaced radially from the outer platform, wherein the inner portion of the annular heat shield includes an axial rim extending upstream and disposed between the outer platform and the inner radial surface.

20. The subassembly of aspect 19, wherein the radially inward arm includes a bore defined therein, wherein the annular heat shield includes a first leg comprising a first slot defined therein, and a second leg spaced upstream from the first leg by a gap receiving the radially inward arm, the second leg comprising a second slot in alignment with the first slot, wherein a pin is disposed within the first and second slots and the bore.

What is claimed is:
1. A subassembly for a gas turbine engine having a longitudinal engine axis, the subassembly comprising:
a carrier having one or more support features to couple to a casing of the engine, the carrier including a downstream end and an upstream end, the upstream end of the carrier including a radially inward arm extending toward the engine axis; and
a radially floating heat shield including an outer end and an inner end, the outer end of the heat shield coupled to the radially inward arm via a joint configured to allow movement of the heat shield relative to the radially inward arm, wherein the heat shield includes a first leg and a second leg, wherein the second leg is spaced from the first leg by a bap formed to receive the radially inward arm.

2. The subassembly of claim 1, wherein the joint is a pin-and-slot joint, the radially inward arm includes a bore defined therein, and the heat shield includes a slot defined therein in alignment with the bore to receive a pin.

3. The subassembly of claim 1, wherein the joint is a foot-and-slot joint, the radially inward arm includes a slot defined therein, and the heat shield includes a foot sized to fit within the slot.

4. The subassembly of claim 1, wherein the inner end of the heat shield includes an upstream extending axial rim.

5. The subassembly of claim 1, wherein the heat shield includes a coupling portion extending radially along the outer end, an upstream extending axial rim, a first bend coupling the coupling portion and the upstream extending axial rim, a radial leg, and a second bend coupling the upstream extending axial rim and the radial leg.

6. The subassembly of claim 5, wherein the heat shield comprises a discrete sheet having a bottom portion securely fixed to the radial leg, and an outer portion spaced from the coupling portion, wherein the outer portion of the discrete sheet defines the second leg.

7. The subassembly of claim 1, wherein the heat shield is an annular structure.

8. The subassembly of claim 1, wherein the first leg and the second leg are coupled to the radially inward arm via the joint.

9. The subassembly of claim 1, wherein the first leg extends along a downstream side of the radially inward arm, and the second leg extends along an upstream side of the radially inward arm.

10. A subassembly for a gas turbine engine including a turbine section, the gas turbine engine comprising:
a casing of a turbine section housing a vane and a turbine blade disposed downstream from the vane, wherein the vane includes an outer platform, the vane coupled to the casing by a vane support element;
a turbine shroud assembly circumferentially disposed about the turbine blade, the turbine shroud assembly including a carrier supporting a blade track; and
a heat shield coupled to the carrier and in movable contact with the outer platform, wherein, in response to thermal contraction of the vane, the heat shield is configured to move radially inward relative to the carrier to maintain contact with the outer platform of the vane.

11. The subassembly of claim 10, wherein the carrier includes a radially inward arm axially spaced from the vane support element and radially spaced from the outer platform, and the heat shield is coupled with the radially inward arm, wherein the radially inward arm includes a bore or a slot defined therein, and the heat shield includes a bore or a slot defined therein in alignment with the bore or the slot of the radially inward arm, the bore and the slot configured and aligned to receive a pin.

12. The subassembly of claim 10, wherein the carrier includes a slot, and the heat shield includes a foot in a coupling portion of the heat shield, the foot slideably positioned in the slot to enable movement of the heat shield in a radial direction in accordance with temperature changes.

13. The subassembly of claim 10, wherein an outer portion of the heat shield comprises a first leg and a second leg spaced from one another to define a gap sized to receive a radially inward arm of the carrier, wherein the first leg comprises the slot defined therein, and the second leg comprises a second slot defined therein in alignment with the slot of the first leg, wherein the pin is extended through said slot, the bore, and the second slot.

14. The subassembly of claim 13, wherein the vane support element includes a downstream facing surface axially spaced from the radially inward arm, and an inner radial surface radially spaced from the outer platform.

15. The subassembly of claim 14, wherein an inner end of the heat shield includes an axial rim extending upstream beyond the downstream facing surface.

16. The subassembly of claim 10, wherein the outer platform includes a ridge extending radially outward toward the heat shield.

17. The subassembly of claim 10, wherein the carrier further includes a radially inward second arm spaced from the radially inward arm by a gap sized to receive an outer end of the heat shield.

18. A subassembly for a gas turbine engine including a turbine section, the gas turbine engine comprising:
   a casing of a turbine section housing a vane and a turbine blade disposed downstream from the vane, wherein the vane includes an outer platform, the vane coupled to the casing by a vane support element;
   a carrier to support a blade track, the carrier circumferentially disposed about the turbine blade and coupled to the casing; and
   an annular heat shield having an outer portion coupled to the carrier and an inner portion contacting the outer platform, the annular heat shield movable between a first configuration and a second configuration, wherein, in the first configuration, the outer portion is at a first radial position, the inner portion is contacting the outer platform and the vane is in a thermal contracted configuration, wherein, in the second configuration, the outer portion is moved radially outward to a second radial position, the inner portion is contacting the outer platform and the vane is in a thermal expanded configuration.

19. The subassembly of claim 18, wherein the carrier including a radially inward arm axially spaced from the vane support element and radially spaced from the outer platform, the vane support element includes a downstream facing surface axially spaced from the radially inward arm, and an inner radial surface spaced radially from the outer platform, wherein the inner portion of the annular heat shield includes an axial rim extending upstream and disposed between the outer platform and the inner radial surface.

20. The subassembly of claim 19, wherein the radially inward arm includes a bore defined therein, wherein the annular heat shield includes a first leg comprising a first slot defined therein, and a second leg spaced upstream from the first leg by a gap receiving the radially inward arm, the second leg comprising a second slot in alignment with the first slot, wherein a pin is disposed within the first and second slots and the bore.

* * * * *